United States Patent [19]

Bowden et al.

[11] Patent Number: 5,588,107
[45] Date of Patent: Dec. 24, 1996

[54] METHOD AND APPARATUS FOR SELECTABLY EXPANDABLE MENUS

[75] Inventors: Lori Bowden, Santa Rosa; Sharon L. Jochums, Sebastopol; Erol Otus, El Cerrito, all of Calif.

[73] Assignee: Island Graphics Corporation, San Rafael, Calif.

[21] Appl. No.: 35,460

[22] Filed: Mar. 22, 1993

[51] Int. Cl.⁶ .................................................. G06F 3/14
[52] U.S. Cl. .................. 395/344; 395/356; 364/DIG. 1; 364/286.2; 364/286.3
[58] Field of Search .................. 364/DIG. 1, DIG. 2; 395/155, 156, 157, 158, 159, 160

[56] References Cited

U.S. PATENT DOCUMENTS

| | | | |
|---|---|---|---|
| 5,060,170 | 10/1991 | Bourgeois et al. | 364/521 |
| 5,065,347 | 11/1991 | Pajak et al. | 395/159 |
| 5,204,947 | 4/1993 | Bernstein et al. | 395/157 |
| 5,230,063 | 7/1993 | Hoeber et al. | 395/156 |
| 5,237,654 | 8/1993 | Shackelford et al. | 395/160 |
| 5,243,697 | 9/1993 | Hoeber et al. | 395/156 |
| 5,255,358 | 10/1993 | Busboom et al. | 395/153 |
| 5,283,864 | 1/1994 | Knowlton | 395/158 |
| 5,297,249 | 3/1994 | Bernstein et al. | 395/156 |
| 5,345,550 | 9/1994 | Bloomfield | 395/156 |
| 5,347,627 | 9/1994 | Hoffmann et al. | 395/157 |

*Primary Examiner*—Thomas G. Black
*Assistant Examiner*—Maria M. Von Buhr
*Attorney, Agent, or Firm*—Townsend and Townsend and Crew; Larry Mendenhall

[57] ABSTRACT

A menu interface including a bounded region divided into menu panels, each panel having a menu option. Selection of the menu option replaces the menu panel corresponding to a particular option with an expanded menu panel having tools, options, features and controls corresponding to the selected option. The menu interface is customizable to allow a user to expand, or contract, one or more panels to provide efficient access to the tools, options, features and controls of the expanded menu panels. Expanded menu panels maintain their relative order, and do not contract after a user makes a selection. Expansion and contraction of menu panels is expressly controlled by the user.

20 Claims, 7 Drawing Sheets

Microfiche Appendix Included
(15 Microfiche, 1 Pages)

METHOD AND APPARATUS FOR SELECTABLY EXPANDABLE MENUS

A portion of the disclosure of this patent document contains material which is subject to copyright protection. The copyright owner has no objection to the facsimile reproduction by anyone of the patent document or the patent disclosure as it appears in the Patent and Trademark Office patent files or records, but, otherwise, reserves all copyright rights whatsoever.

MICROFICHE APPENDIX

This specification includes microfiche Appendix A having 1 sheet with 15 frames, hereby expressly incorporated by reference for all purposes.

BACKGROUND OF THE INVENTION

The present invention relates generally to selection of options or desired features for computer systems employing user interfaces having menus, e.g., graphically-oriented user interfaces (GUI). More specifically, the present invention relates to a system and method for managing menu/option choices displayed on a monitor of a computer employing such a user interface.

Some applications executable on the computer system have a large number of features, options, and tools that a user is able to customize and select. One common mechanism for selecting features, options and tools is by way of a "menu" of choices presented by the particular application or operating system. The menu is often a horizontal row of word choices identifying general categories of options. A user is able to select one of the menu choices through use of an input device, e.g. mouse or other relative-pointing device, attached to the computer system. In a well known fashion, the mouse controls a position of a cursor displayed on the screen.

Selecting the menu item, such as by activating a button associated with the mouse when the cursor overlies the menu choice will select that menu item. If the item identifies a category, a "drop-down" menu of choices related to that category will be presented to the user. The user then is able to select an item or choice to further select an option tool or feature, or activate a "fly-out" menu of additional menu choices, or to select a dialog box for making a particular choice.

The menu structure works well to hierarchically organize the various features available to a user. There are, however, a number of drawbacks to the conventional menu system. One difficulty is that the conventional menu system is designed to allow only a single selection before reverting back to the initial state. For complex menus, as is typical for applications having a large number of menu options, it becomes necessary to navigate a number of submenus each time a feature is desired. In some instances, it is necessary to periodically toggle a selection, or to otherwise make many selections from the menu. These actions can reduce the usefulness of the program as the user may spend significant time just using the menus to make the desired selections.

In an effort to improve the performance of these menus, various refinements have been made to the conventional menuing systems. One such refinement relates to providing shortcut keys to automatically and directly make a selection from a menu choice without navigating the menu structure to the particular desired menu option. This system moves away from the user interface paradigm as it requires memorization of key combinations, and requires use of a keyboard. To overcome this difficulty, a system was developed for directly selecting desired features through use of the mouse. These systems go by different names, but are generally referred to as iconbars or palettes. Selection of an icon or a palette image would directly select a feature desired by the user. These systems tend to be somewhat inefficient in space requirements, as they provide only a relatively few number of options. Customization of the palette or iconbar can sometimes be difficult.

Another innovation relates to "tear off" menus that provide a user with the ability to lock a particular menu or submenu open. Thereafter, selections can be made continuously from the locked menu. These systems tend to clutter up a screen area because they cannot be customized. It may be that several sets of tear off menus are needed to provide the access to a commonly used subset of functions. There is no quick and easy way to allow a user to configure a tear-off menu to include only desired features. Tear off menus must be used as the application presents them, with the function groupings preconfigured.

FIGS. 7–10 identify some of the menuing systems of conventional applications available in a graphical user interface generated under the Microsoft WINDOWS environment. FIG. 7 is an illustration of a window 500 having a menu list 502. Menu list 502 is arranged horizontally across the top of window 500 and is made up of a plurality of menu options.

FIG. 8 is an illustration of window 500, and a conventional menuing system, when a menu option is activated. As illustrated in FIG. 8, selection of the "File" menu option from menu list 502 causes a "drop-down" menu 504 to overlie part of window 500. The menu option "File" is inverted to indicate it has been selected. Note that drop-down menu 504 presents additional choices as menu options.

Some of the options, such as the "Empty Clipboard", "Exit Task Manager", and "Exit Windows" options, will initiate some action. Other menu options, such as the "Run ..." and the "Edit Run Contents ..." options cause a dialog box to be displayed to allow the user to take some desired action, or to select some feature. The ellipsis following the menu option identifies the option as one that will display a user dialog box. The "Preferences" menu option will cause a "fly-out" menu to be displayed, from which other menu options are available. The small triangle to the right of the menu option identifies the menu option as producing a fly-out menu.

FIG. 9 is an illustration of a dialog box 506 produced after the user selects the "Run" option from the drop-down menu 504 of FIG. 8. Dialog 506 allows the user to, in this case, to select an application to be executed by the processor 108.

FIG. 10 is an illustration of a fly-out menu 508 generated after the "Preferences" menu option from drop-down menu 504 is activated. Again, the menu option "Preferences" is highlighted and an additional series of menu options are displayed to the user. After selecting a menu option from this menuing system, the menu returns to the display in FIG. 7, unless the selected menu option is inconsistent with redisplaying window 500, such as when the system exits or a new application is launched.

As illustrated, navigation of this type of menu system allows a user to select a particular menu option in a multilevel menu structure. Unfortunately, only one selection may be made at a time, before returning to window 500 as in FIG. 7. Thus, for an application requiring frequent access to the menu options, such a menu system is inefficient.

SUMMARY OF THE INVENTION

The present invention provides a system and method for simply, efficiently and economically displaying a customized set of features available on a master menu to a user for selection.

According to one aspect of the invention, it includes a master menu displaying a commonly used set of menu options on a monitor of a computer system. The menu options are displayed in a particular order, with the master menu divided into several menu panels, each having an associated menu option. The computer system includes a processor, a memory and a user input device. In a well known fashion, the user input device is able to control positioning of a selection tool, e.g. a pointer, presented on the monitor. A user makes selections through activation of a button associated with the input device when the selection tool is moved to a particular location.

In operation, a user activates the master menu system that causes the processor to access a menu definition list to determine the master menu items. The processor then is able to bound a region on the monitor and divide it into a plurality of menu panels, one menu option per panel. The preferred embodiment provides the menu options in a vertical list, in a predetermined order. Each menu panel of the preferred embodiment includes a selection region identified by an icon. Selection of the icon of a particular menu panel expands that menu panel. The expanded menu panel replaces the unexpanded menu panel in the master menu and maintains the predetermined order of the panels of the master menu. The expanded menu panel includes a second selection region, also identified by an icon, for contracting the expanded menu panel to the unexpanded menu panel having the menu option.

The expanded menu panel includes one or more tools, features, or selections identified by the menu option associated with the corresponding contracted menu option panel. The user is able to make selections from the expanded menu option without the expanded menu panel automatically contracting to the unexpanded menu panel.

As the user is able to expand as many of the menu panels as desired, the user is able to customize the master menu. For example, those tools which may be particularly applicable for a certain task may be selected to appear in one or more expanded panels, speeding up selection of those tools. Thus, menu navigation time is eliminated, speeding up use of the application, and thereby improving efficiency and speed of use. The user is also able to recustomize the master menu's expanded and contracted menu panels to match particular tasks, again improving use of the application employing the master menu.

The master menu of the preferred embodiment also includes two positioning icons. Activation of one of these positioning icon causes the computer system to move the location of the master menu to a predetermined position. Selection of the other positioning icon moves the master menu's location to another predetermined position. In the preferred embodiment having a vertical arrangement of the expanded and contracted menu panels, the positioning icons locate the master menu at the extreme side edges of the monitor. This allows a user to simply relocate the master menu to access a feature below or near the master menu.

Additional features of the preferred embodiment of the master menu structure include linear alignment of the expansion and contraction icons of the contracted and expanded menu panels, respectively. The preferred embodiment includes appropriate controls and selection regions of the expanded menu panels in line with the expansion and contraction icons, further simplifying use of the master menu.

Reference to the remaining portions of the specification, including the drawing and the claims, provides further features and advantages of the present invention.

BRIEF DESCRIPTION OF THE DRAWING

FIG. 7 is an illustration of a window 500 having a menu list 502;

FIG. 8 is an illustration of window 500, and the conventional menuing system, when a menu option is activated;

FIG. 9 is an illustration of a dialog box 506 produced after the user selects the "Run" option from the drop-down menu 504 of FIG. 8; and FIG. 10 is an illustration of a fly-out menu 508 generated after the "Preferences" menu option from drop-down menu 504 is activated.

DESCRIPTION OF THE PREFERRED EMBODIMENTS

Figure 1:
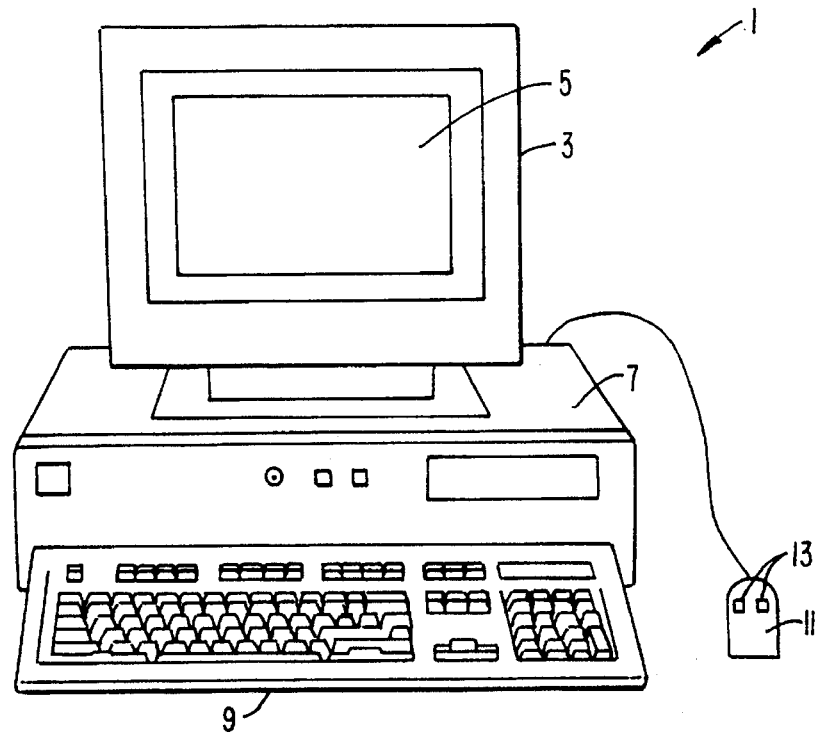
FIG. 1 is an illustration of computer hardware suitable for implementing the present invention.

FIG. 1 is an illustration of computer hardware suitable for implementing the present invention. FIG. 1 shows computer system I including monitor 3, display screen 5, housing 7, keyboard 9 and mouse 11. Mouse 11 may have one or more mouse buttons such as buttons 13. Housing 7 encloses typical computer components such as a processor, memory, disk drives and peripheral interface adapter (not shown).

FIG. 1 represents but one type of computer system suitable for embodying the present invention. Other types of computer systems suitable for use in the present invention include so-called "notebook," "palmtop" or "hand-held," "pentop," etc., computers. Further, the use of the term "mouse" or "user input device" is understood to include other means for inputting information into a computer such as a touch screen, trackball, MIDI keyboard, light pen, data glove, etc. It will be readily apparent to one of ordinary skill in the art that many types of computer hardware, and configurations of the hardware, are suitable for use in conjunction with the present invention.

Figure 2:
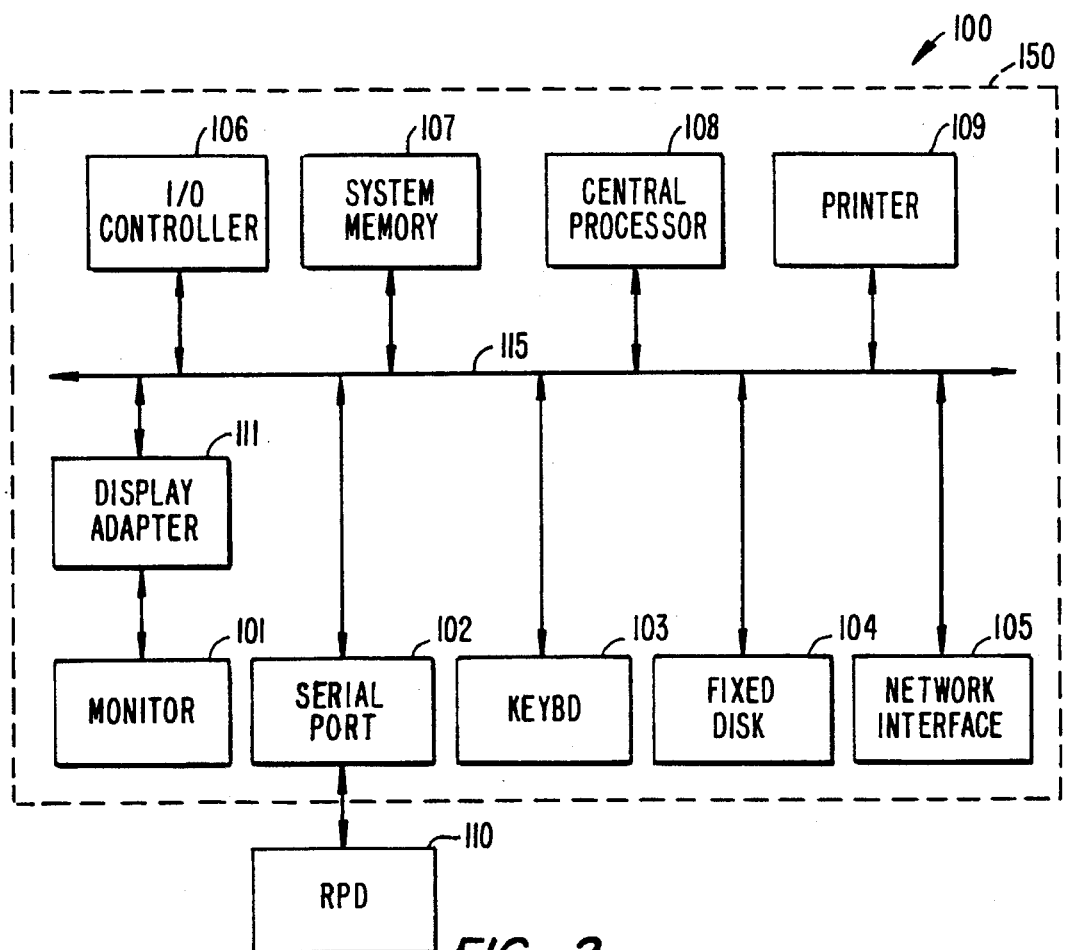
FIG. 2 is a menu option presentation and selection system 100 for implementing selectably expandable menus using the computer system 1.

FIG. 2 is a menu option presentation and selection system 100 for implementing selectably expandable menus using the computer system 1. The layout design system 100 includes a computer system 150 coupled to a relative-pointing device (RPD) 110, for example a trackball or a mouse. The computer system 150 includes a central processor 108, a system memory 107, an input device, for example a keyboard 103, a fixed disk 104, a monitor 101, an external interface 105, a printer 109, an input/output I/O) controller 106, a communications port 102, and a display adapter 111. A system bus 115 connects the components of the computer system 150, providing a link among them. The keyboard 103 and RPD 110, taken individually or jointly, are data entry devices with which a user of the computer system 150 can interact with the layout design system 100.

Figure 6:
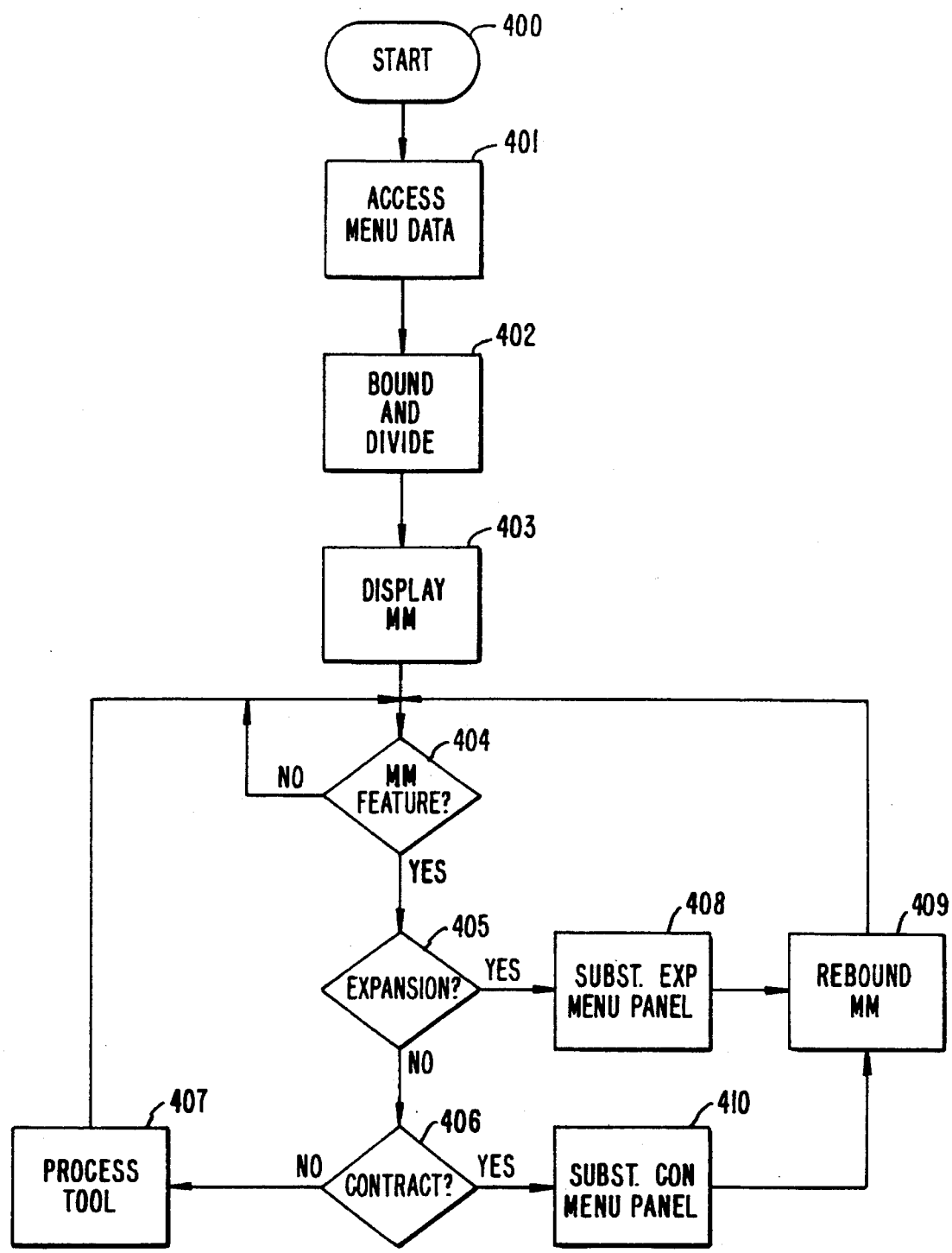
FIG. 6 is a flowchart of operation of the master menu selection system according to the preferred embodiment of the present invention.
Figure 7:
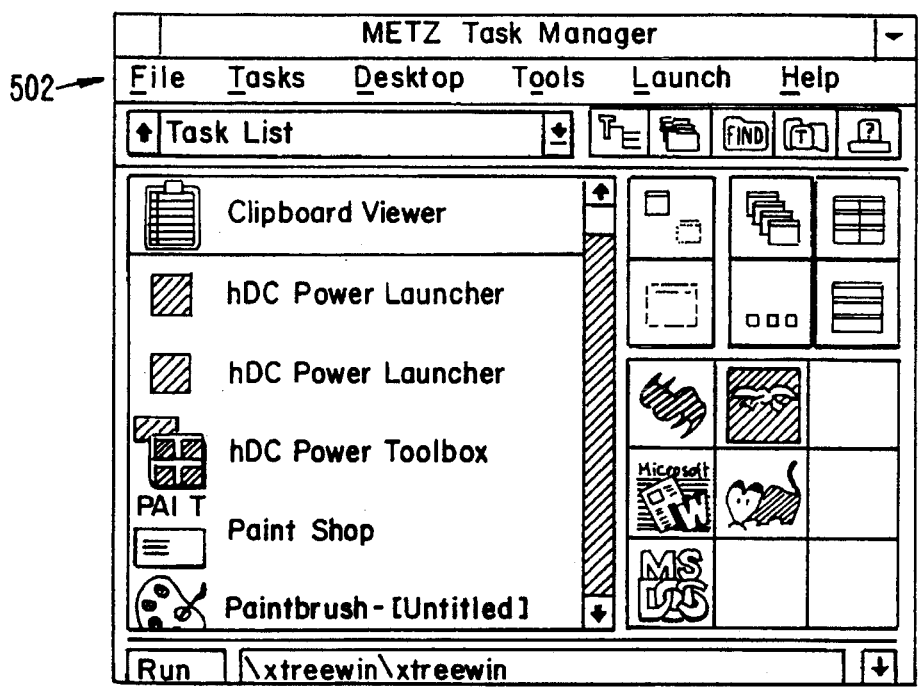
FIGS. 7–10 identify some of the menuing systems of conventional applications available in a graphical user interface generated under the Microsoft WINDOWS environment.
Figure 8:
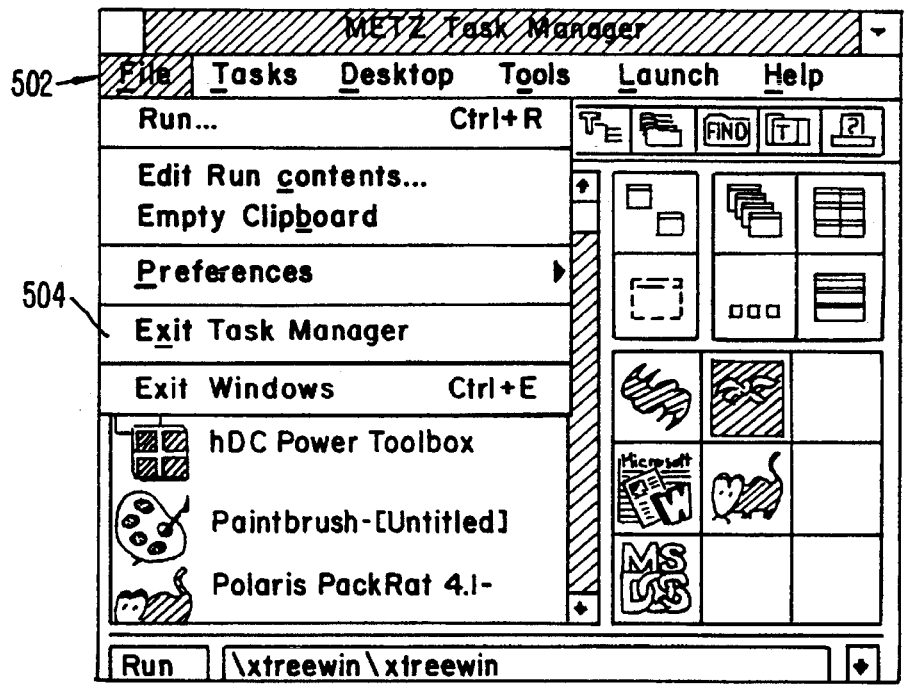
Figure 9:
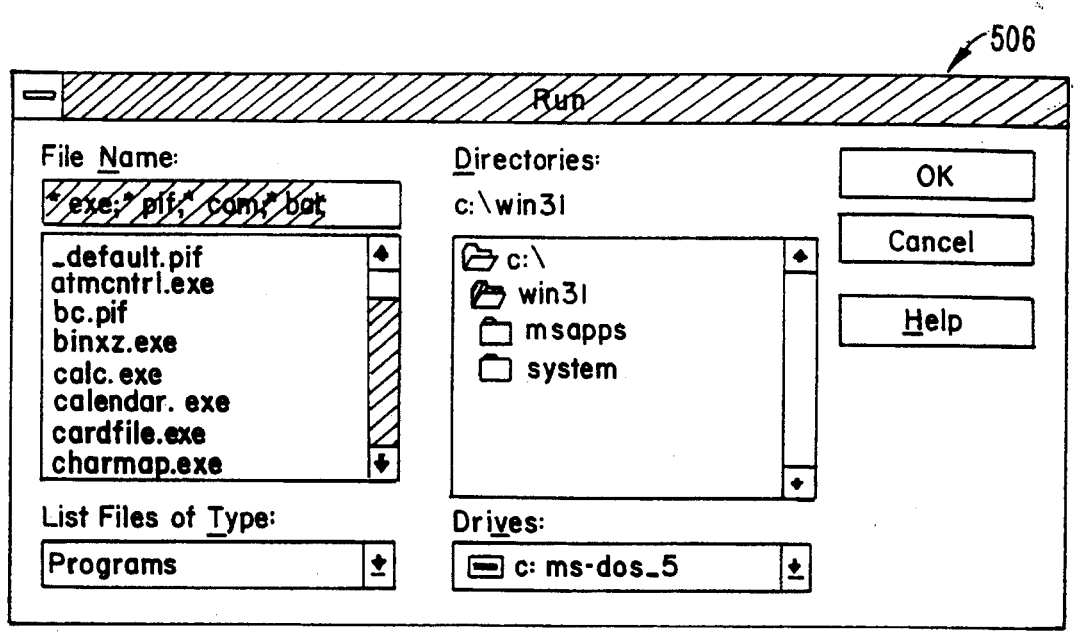
Figure 10:
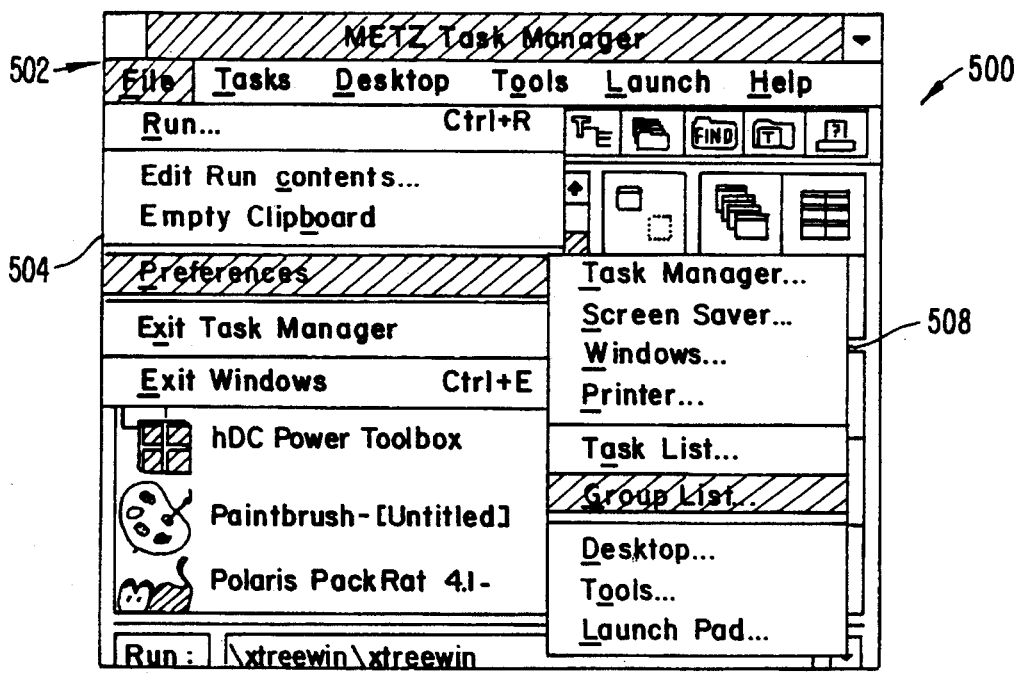

A preferred embodiment uses an appropriately programmed workstation marketed by Sun MicroSystems' SparcStation using a UNIX-compatible operating system known as SUN-OS. It is to be understood that other platforms are available and may embody the invention in other forms. The invention is not limited to embodiments that include workstations, but may include other platforms, such as Apple MACINTOSH® computers (Apple Computer, Cupertino, Calif.) or IBM-compatible PCs, for example. The flowchart of FIG. 6 is implemented by the central processor 108 under appropriate process control and instruction from procedures stored in the system memory 107 and provided as a part of the layout design system 100.

Figure 3:
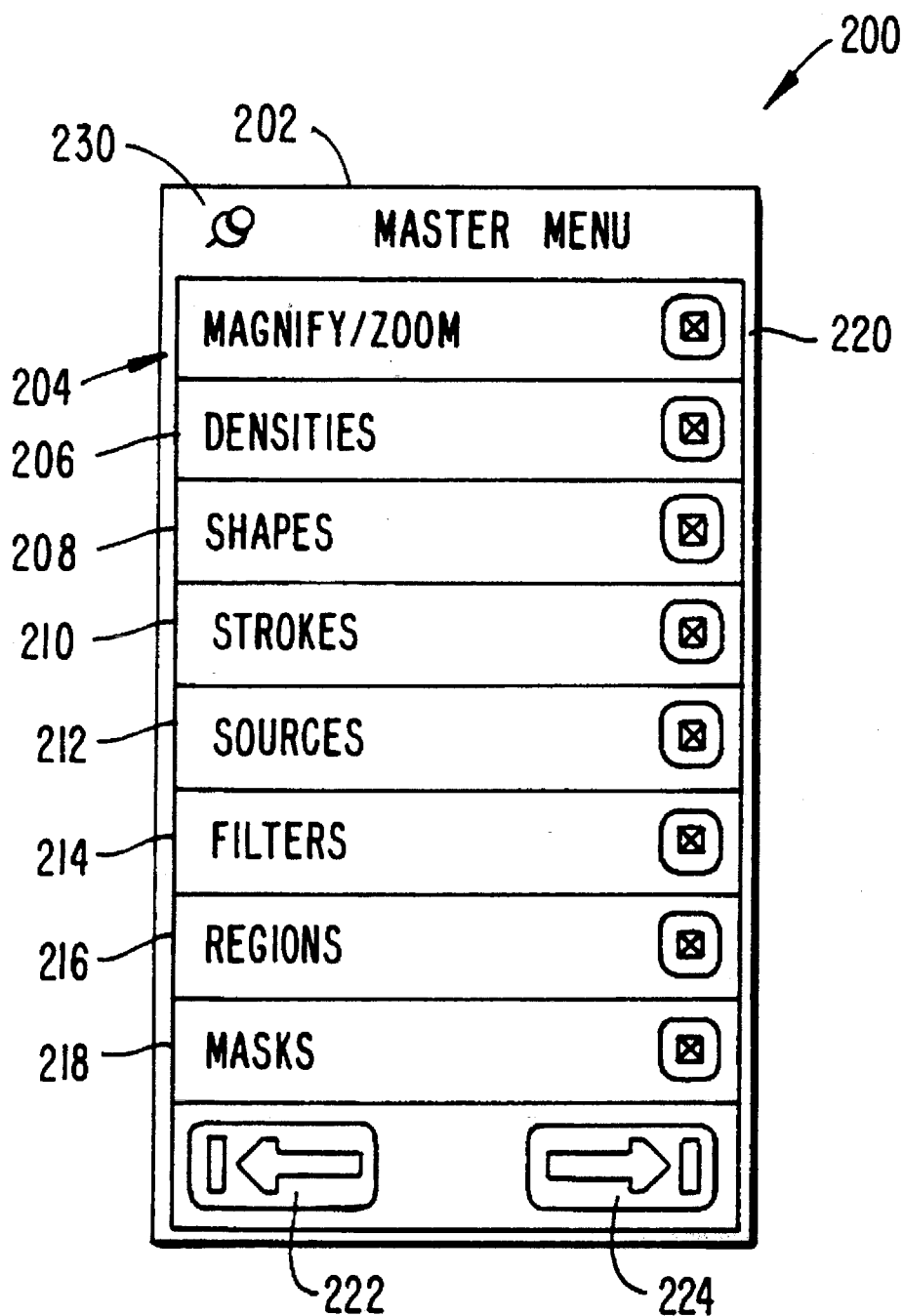
FIG. 3 is an illustration of the preferred embodiment for a master menu 200 included in an application for a graphic illustration program.

FIG. 3 is an illustration of the preferred embodiment for a master menu 200 included in an application for a graphic illustration program. Master menu 200 is presented on monitor 101 in conventional fashion. Master menu 200 includes a bounded region 202 divided into a plurality of menu panels 204–218. Each menu panel includes an associated menu option and an active selection region 220. Master menu 200 includes positioning regions 222 and 224 for shifting master menu 200 to predefined positions. Additionally, the master menu includes a locking icon 230.

Bounded region 202 includes the plurality of menu panels 204–218 in a relative order, with the preferred embodiment orienting the menu options in a vertical fashion. Each menu option has associated with it tools or features to control some aspect of an application or system.

In operation, a user is able to activate any of the expansion icons 220 of one or more of the menu panels. Doing so results in the processor determining a new bounding region as it replaces activated menu panels with expanded menu panels as further explained below.

Activation of positioning icon 222 repositions master menu 200 to an extreme left edge of monitor 101. Conversely, activation of positioning icon 224 repositions master menu 200 to an extreme right-hand edge of monitor 101.

Figure 4:
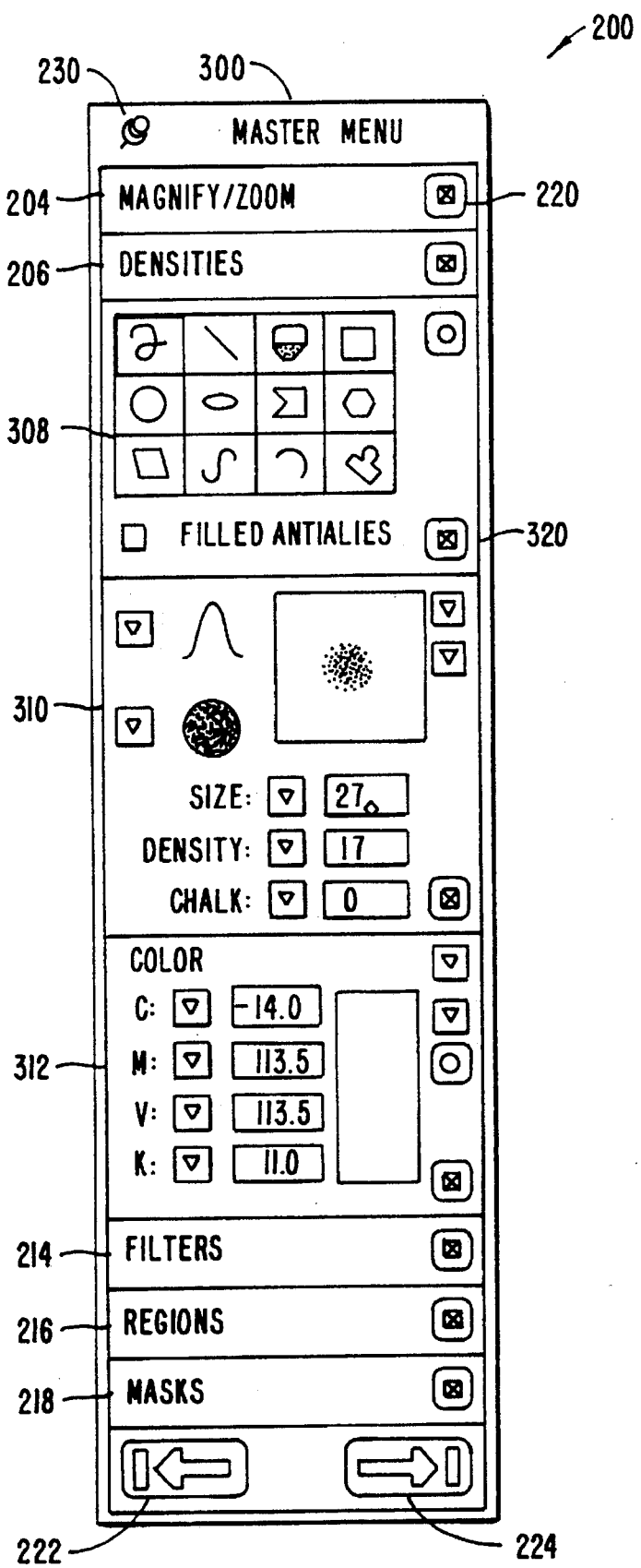
FIG. 4 is an illustration of the preferred embodiment for master menu 200 having selected menu panels 208, 210, and 212 expanded by selection of each menu panel's expansion icon 220.

FIG. 4 is an illustration of the preferred embodiment for master menu 200 having selected menu panels 208, 210, and 212 expanded by selection of each menu panel's expansion icon 220. With one or more expanded menu panels, the processor determines a new bounding region 300 to include contracted and expanded menu panels in the predetermined order. Upon selection of the appropriate expansion icon, menu panel 208 is replaced by an expanded menu panel 308, menu panel 210 is replaced by an expanded menu panel 3 10, and menu panel 212 is replaced by an expanded menu panel 312. Each expanded menu panel includes a contraction icon 320. Activation of the contraction icon 320 of a particular expanded menu panel contracts that menu panel to return it to its corresponding contracted menu panel state.

Expanded menu panel 308 provides a palette of shapes and other options available to a user, corresponding to its associated contracted menu panel's associated menu option, i.e. "Shapes". Similarly, expanded menu panel 310 provides tools for controlling "Strokes" while expanded menu panel 312 corresponds to tools for "Sources", as these tools respectively correspond to the menu options for the contracted menu panels 210 and 212.

In operation, a user can select tools and options from the different expanded menu panels, as needed, without the selection causing tools to disappear. The user can activate positioning icons 222 and 224 to move master menu should it be desirable or necessary to access some feature under or near master menu 200's present position. An important feature of the preferred embodiment is that the contracted and expanded menu panels maintain their relative order, without overlapping or overlying other parts of master menu 200.

Figure 5:
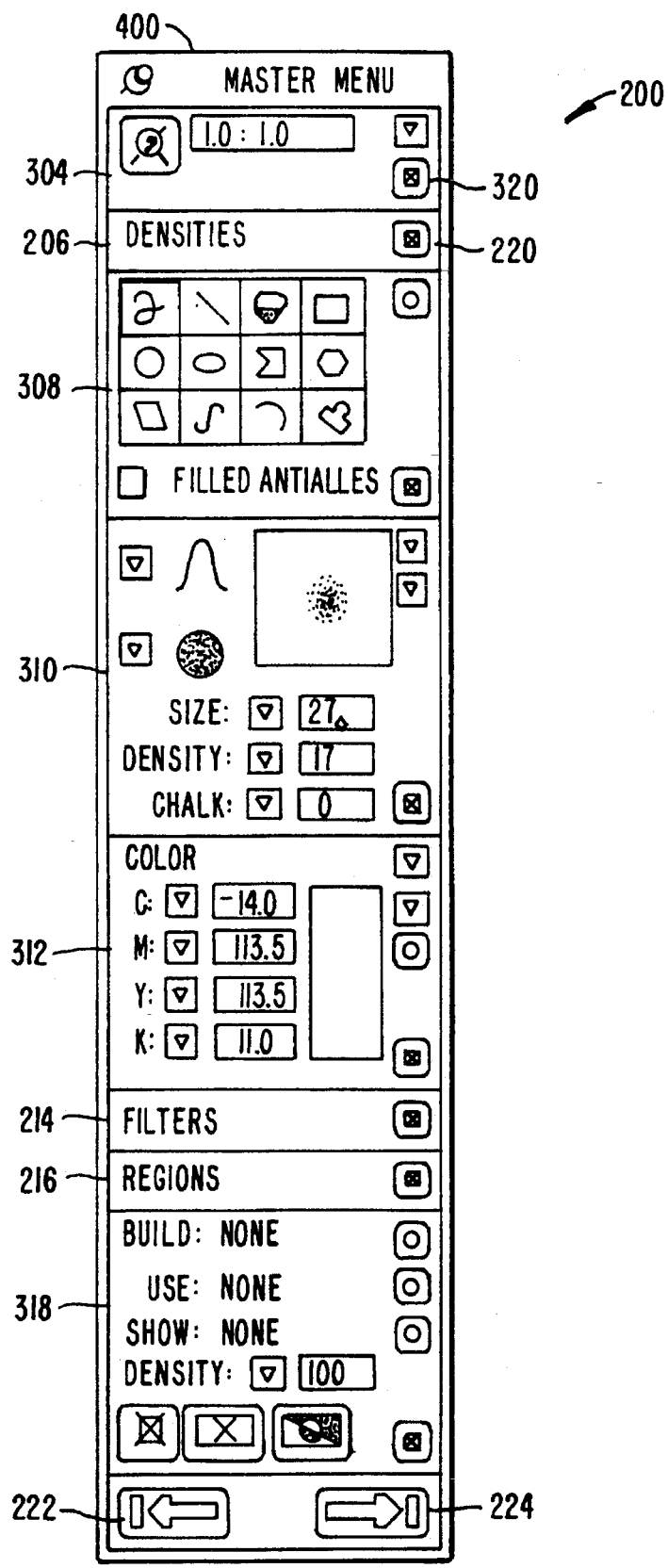
FIG. 5 is an illustration of the preferred embodiment for master menu 200 illustrated in FIG. 4 having selected menu panels 204 and 218 additionally expanded by selection of each menu panel's expansion icon 220.

FIG. 5 is an illustration of the preferred embodiment for master menu 200 illustrated in FIG. 4 having selected menu panels 204 and 218 additionally expanded by selection of each menu panel's expansion icon 220. As described above, an expanded menu panel includes tools or features corresponding to the menu option of its corresponding contracted menu panel. For example, expanded menu panel 304 includes magnification and zoom controls corresponding to "Magnify/Zoom" and expanded menu 318 includes controls and options for the "Masks" menu option of contracted menu panel 218. For master menu 200, a new bounding region 400 to maintain the expanded and contracted menu panels in their relative order.

FIG. 6 is a flowchart of operation of the master menu selection system according to the preferred embodiment of the present invention. The process begins at step 400 which does some initialization of the computer system 1. Thereafter, processor 108 accesses a menu list data definition stored in memory 107. The menu list defines menu options and corresponding tools for the expanded menu panel. Also, the menu list data definition provides the menu options in a particular order.

Step 402 has the processor 108 bound and divide a region of memory 107. The bounded and divided memory defines the plurality of menu panels and associated options, in the order they are to be displayed. Thereafter, at step 403, master menu 200 defined in system memory 107 is presented on the monitor 101.

System 1 then waits, step 404, for a user to select a feature of master menu 200. As long as no feature is selected, the process flow cycles through step 404. When the user selects a feature of master menu 404, the process advances to step 405 to test whether the user selected a menu panel for expansion. If not, the process tests at step 406 whether the user selected an expanded menu panel to be contracted. If not, the user must have selected a tool of an expanded menu or activated one of the control icons, such as the positioning icons 222 or 224. Therefore, the process then processes that tool or responds appropriately to the activation of the positioning feature. Thereafter, the process returns to step 404 to wait for the user to select another feature of master menu 200.

If at step 405, the user had activated an expansion icon to expand a particular menu panel, the process would have advanced to step 408 rather than the test at step 406. The process substitutes an expanded menu panel for the menu panel selected by the user in step 408. Thereafter processor 108 rebounds master menu 200 to encompass the substituted expanded menu panel.

If instead, the user at step 406 had selected an expanded menu panel for contraction, the process would have advanced to step 410 rather than step 407. Step 410 substitutes a contracted menu panel for the expanded menu panel identified by the user and thereafter advances to step 409 to rebound master menu 200. After step 409, the process advances to step 404 to test whether the user activates or selects another feature of master menu 200.

In conclusion, the present invention provides a simple, efficient solution to a problem of navigating hierarchical menu structures to select multiple options while still providing a user with the ability to customize the available options. While the above is a complete description of the preferred embodiments of the invention, various alternatives, modifications, and equivalents may be used. For example, the master menu may have its menu options horizontally disposed, or be multi-dimensionally distributed, rather than vertically oriented. Optionally, the expansion/selection icons may be dispensed with to allow expansion of a menu panel from selection of just a portion (a few pixels wide area) of a particular menu panel, or directly from selection of a specific menu option itself without use of the specialized expansion and contraction icons. While the preferred embodiment maintains the menu panel or their substituted expanded menu panels, in a predetermined order, for some applications it may be desirable to shift all expanded menu panels to a particular location or region of a master menu rather than maintaining the order. The preferred embodiment uses activation of mouse buttons to expand and contract menu panels. It is possible to employ other input devices to expand and contract menu panels, e.g., a keyboard could be used. For example, a cursor could be positioned on a particular panel to be expanded or contracted responsive to a particular keypress, or key sequence. Alternately for example, numeric choices may identify particular menu panels to be expanded or contracted. Therefore, the above description should not be taken as limiting the scope of the invention which is defined by the appended claims.

What is claimed is:

1. A method for presenting and selecting menu options on a display of a computer system having a processor and an input device, the method comprising the steps of:

bounding a panel region on the display, by use of the processor, into a plurality of menu panels, each menu panel comprising a menu option, said plurality of menu panels having a position relationship to each other;

operating the input device to select a first particular one of said plurality of menu panels comprising a first particular one menu option; and expanding said first particular one menu panel to present a first expanded menu panel having options associated with but excluding said first particular one menu option, said first expanded menu panel presented in place of said first particular one menu panel while maintaining said position relationship of said plurality of menu panels.

2. The menu options presenting and selecting method of claim 1 further comprising the steps of:

operating the input device to select a second particular one of said plurality of menu panels while said first particular one menu panel is expanded, said second particular one menu panel comprising a second particular one menu option; and expanding said second particular one menu panel to present a second expanded menu panel having options associated with but excluding said second particular one menu option, said second expanded menu panel presented in place of said second particular one menu panel while maintaining said position relationship of said plurality of menu panels.

3. The menu options presenting and selecting method of claim 1 further comprising the steps of:

operating the input device to select said first expanded menu panel; and contracting said first expanded menu panel to present said first particular one menu panel having said first particular one menu option, said first particular one menu panel presented in place of said first expanded menu panel while maintaining said position relationship of said plurality of menu panels.

4. The menu options presenting and selecting method of claim 2 further comprising the steps of:

operating the input device to select said second expanded menu panel; and contracting said second expanded menu panel to present said second particular one menu panel having said second particular one menu option, said second particular one menu panel presented in place of said second expanded menu panel while maintaining said position relationship of said plurality of menu panels.

5. The menu options presenting and selecting method of claim 1 wherein said input device operating step further comprises the step of:

activating said first particular one menu option on said first particular one menu panel to initiate said first particular one menu panel expanding step.

6. The menu options presenting and selecting method of claim 2 wherein said input device second menu panel operating step further comprises the step of:

activating said second particular one menu option on said second particular one menu panel to initiate said second particular one menu panel expanding step.

7. The menu options presenting and selecting method of claim 3 wherein said input device first expanded menu panel operating step further comprises the step of:

activating an option on said first expanded menu panel to initiate said first expanded menu panel contracting step.

8. The menu options presenting and selecting method of claim 4 wherein said input device second expanded menu panel operating step further comprises the step of:

activating an option on said second expanded menu panel to initiate said second expanded menu panel contracting step.

9. The menu options presenting and selecting method of claim 1 wherein said position relationship is a vertical arrangement of said plurality of menu panels.

10. The menu options presenting and selecting method of claim 1 wherein said position relationship is a horizontal arrangement of said plurality of menu panels.

11. The menu options presenting and selecting method of claim 1 wherein said position relationship is a two-dimensional array arrangement of said plurality of menu panels.

12. The menu options presenting and selecting method of claim 1 wherein said position relationship is a two-dimensional matrix arrangement of said plurality of menu panels.

13. The menu options presenting and selecting method of claim 1 wherein said position relationship is a multi-dimensional arrangement of said plurality of menu panels.

14. The menu options presenting and selecting method of claim 5 wherein each of said plurality of menu panels includes a selection region, and said selection regions of said plurality of menu options are linearly arranged.

15. The menu options presenting and selecting method of claim 7 wherein each of said plurality of menu panels includes a selection region, and said selection regions of said plurality of menu options are linearly arranged.

16. The menu options presenting and selecting method of claim 15 wherein said selection region of said expanded menu panel is aligned with said selection regions of said plurality of menu options.

17. The menu options presenting and selecting method of claim 16 wherein each said selection region is identified by an icon presented as part of its associated menu panel.

18. A method for presenting and selecting menu options on a display of a computer system having a processor and an input device, the method comprising the steps of:

bounding a panel region on the display, by use of the processor, into a plurality of menu panels, each menu panel comprising a menu option, said plurality of menu panels having a position relationship to each other;

operating the input device to activate a particular one of said plurality of menu panels comprising a particular menu option; and replacing said particular one menu panel with an expanded menu panel having options associated with but excluding said particular menu option while the processor maintains said position relationship among said plurality of menu panels and said expanded menu panel.

19. A system for presenting and selecting menu options, comprising:

a computer system having a processor, a display and an input device;

means, coupled to said processor and said display, for presenting a first bounded region composed of a plurality of menu panels, each menu panel comprising a menu option, and said plurality of menu panels arranged in a particular position relationship with each other;

means, coupled to said input device and said processor, for selecting a particular one of said plurality of menu panels comprising a particular menu option, said processor responsive to control signals from said input device to select said particular one of said plurality of menu panels comprising said particular one menu option;

means, coupled to said selecting means, for activating said particular one menu panel;

means, coupled to said activating means and to said processor, for expanding said particular one menu panel to produce an expanded menu panel having control features associated with but excluding said particular menu option, said expanding means determining a second bounded region composed of said expanded menu panel and said plurality of menu panels except for said particular one menu panel while maintaining said particular position relationship with said expanded menu panel substituted for said particular one menu panel; and means, coupled to said expanding means and to said display, for presenting said second bounded region.

20. An apparatus for controlling a master menu, the master menu including a plurality of menu options, one associated with each of a plurality of menu panels, displayed on a computer monitor, the computer monitor coupled to a processor, memory, and a user input device for issuing selection commands to a menu panel selection means, coupled to the processor, for controlling selection of menu panel items responsive to issued selection commands, the apparatus comprising:

a menu list data definition stored in the memory to define a number, a type, and a relative order of the menu options;

menu definition means, coupled to the processor and to the memory, for bounding a first region and partitioning said first region into a plurality of divisions corresponding to the plurality of menu options;

menu display means, coupled to said master menu definition means and said menu list data definition, for displaying said bounded region, including said plurality of divisions, on the monitor in accordance with said relative order;

menu option identification means, coupled to the menu panel selection means, for identifying a particular one menu option; and menu expanding means, coupled to said processor, for expanding a particular one of said plurality of divisions corresponding to said particular one menu option to replace said particular one division with an expanded division including a tool associated with said particular one menu option, said expanded division excluding said particular one menu option said processor determining a second bounded region to maintain said relative order with said expanded division substituted for said particular one division.

* * * * *